(12) United States Patent
Slavin et al.

(10) Patent No.: US 6,675,193 B1
(45) Date of Patent: Jan. 6, 2004

(54) METHOD AND SYSTEM FOR REMOTE CONTROL OF A LOCAL SYSTEM

(75) Inventors: Sean Slavin, Dana Point, CA (US); Jay S. Cook, Trabuco Canyon, CA (US); Hatem K. El-Sabaaly, Lake Forest, CA (US)

(73) Assignee: Invensys Software Systems, Foxboro, MA (US)

( * ) Notice: Subject to any disclaimer, the term of this patent is extended or adjusted under 35 U.S.C. 154(b) by 0 days.

(21) Appl. No.: 09/430,464

(22) Filed: Oct. 29, 1999

(51) Int. Cl.[7] .............................................. G06F 15/16
(52) U.S. Cl. ...................... 709/200; 709/203; 709/217; 717/127
(58) Field of Search ................................ 709/200–203, 709/213, 217–219, 226, 229, 313, 315, 318; 707/10, 101–104, 200; 717/127, 130, 135

(56) References Cited

U.S. PATENT DOCUMENTS

| | | | |
|---|---|---|---|
| 5,122,948 A | | 6/1992 | Zapolin |
| 5,307,463 A | | 4/1994 | Hyatt et al. |
| 5,550,984 A | | 8/1996 | Gelb |
| 5,598,536 A | | 1/1997 | Slaughter, III et al. |
| 5,619,638 A | * | 4/1997 | Duggan et al. ............. 709/315 |
| 5,623,601 A | | 4/1997 | Vu |
| 5,720,035 A | | 2/1998 | Allegre et al. |
| 5,778,173 A | | 7/1998 | Apte |
| 5,778,174 A | | 7/1998 | Cain |
| 5,790,977 A | | 8/1998 | Ezekiel |
| 5,805,442 A | | 9/1998 | Crater et al. |
| 5,805,803 A | | 9/1998 | Birrell et al. |
| 5,826,014 A | | 10/1998 | Coley et al. |
| 5,828,674 A | | 10/1998 | Proskauer |
| 5,847,957 A | | 12/1998 | Cohen et al. |
| 5,875,322 A | | 2/1999 | House et al. |
| 5,884,025 A | | 3/1999 | Baehr et al. |
| 6,012,100 A | * | 1/2000 | Frailong et al. ............. 709/250 |
| 6,259,443 B1 | * | 7/2001 | Williams, Jr. ................ 709/201 |
| 6,304,895 B1 | * | 10/2001 | Schneider et al. ........... 709/203 |
| 6,343,311 B1 | * | 1/2002 | Nishida et al. .............. 709/203 |
| 6,463,468 B1 | * | 10/2002 | Buch et al. .................. 709/219 |

OTHER PUBLICATIONS

Desktop Teleoperation via the World Wide Web, Goldberg, et al., University of Southern California.
Beyond the Web: Excavating the Real World Via Mosaic, Second International WWW Conference.

* cited by examiner

Primary Examiner—Bharat Barot
(74) Attorney, Agent, or Firm—Cooley Godward LLP

(57) ABSTRACT

A system and method for remote control including a control system having a memory and a CPU for sending and receiving control information and instructions at a first location, a software application for manipulating the control information sent and received by the control system resident in the memory, a remote computer system having a CPU and memory at a second location communicating over a communication path with the control system at the first location and one desktop bound software application for manipulating the control information sent and received by the control system accessed by the remote computer system over the at least one communication path resident in the memory of the remote computer system. In variations, the control information includes alarm data, runtime data and historical data.

27 Claims, 15 Drawing Sheets

METHOD AND SYSTEM FOR REMOTE CONTROL OF A LOCAL SYSTEM

FIELD OF THE INVENTION

This invention relates generally to data processing systems and, more particularly, to a method and system for accessing remote computer systems and operating at least one particular instance of a program running on the local computer on the remote computer system.

BACKGROUND OF THE INVENTION

Many programs are currently implemented in object-oriented programming languages, such as the C++ programming language. The display icons that represent data or resources are typically representations of data structures called objects, which encapsulate attributes and behaviors. Objects are specified by definitions, called classes, that specify the attributes and behaviors of the particular objects, which are termed "instantiations" of the class definitions. The reference Budd, T., "An Introduction to Object-Oriented Programming," Addisori-Wesley Publishing Co., Inc. 1991, provides an introduction to object-oriented concepts and terminology.

Object-oriented programming languages make it easier for system programmers to implement the Graphical User Interface (GUI) concepts of icons and lists. For example, if the GUI icons are represented as object-oriented programming objects, the GUI program can be written so that the status of the icon is continuously updated. In this way, it is relatively simple for the GUI program to be written so that the icons can be selected with the graphical user input device and moved about on the computer system display as desired.

With the advent of object-oriented languages also came object-oriented development environments. Such development environments are computer programs or groups of computer programs that allow a software developer to create object-oriented programs. Object-oriented development environments typically have a palette of objects with which the developer builds an application. Each object on this palette is different and serves as a template for the developer. A palette object's attribute settings are the default settings for that object. To use an object on the palette, the developer copies the object and places the copy on the application. The copied or "derived" object has the same attribute settings as the original palette object. These development environments also permit the developer to modify an object and save it as another palette object or create an entirely new object.

Efforts have been made to establish a common method of communication between objects instantiated within a given operating system environment. For example, Microsoft Corporation has established a protocol, known as the Component Object Model (COM), which governs the interaction between software objects within the Microsoft Windows operating environment. COM provides a standard framework which permits objects from different applications to share data and functions. COM also permits a given application program ("container application") to contain multiple objects of different types. A format for control objects known as "ActiveX" has been established to take advantage of the COM protocol. An ActiveX object behaves as a "server" relative to its container application, which in turn behaves as a "client." The COM protocol manages, among other things, the setup and initialization necessary for container applications to send and receive messages and data to and from server applications.

In the context of an ActiveX control, stored data members are known as "properties," functions are referred to as "methods," and event occurrences are denoted as "events." Properties can be read from, and written to, an ActiveX control via associated methods. The interface of an ActiveX control is a set of methods defining certain input, output and behavior rules. Accordingly, a container application can invoke the methods of an ActiveX control to effect the defined behavior and access the object data.

In addition to representing data stored by an ActiveX control, properties are used in formatting the display of an ActiveX control. Events are utilized to notify a container application of the occurrence of an event, as well as to pass parameters relevant to the particular event. For example, an ActiveX control is capable of informing its container application of the occurrence of a selection event (e.g., when the user interface of the control has been "clicked on").

ActiveX objects are typically implemented either as in-process servers where the ActiveX control is implemented as a Dynamic Link Library (DLL), or as out-of-process servers as an "executable." ActiveX DLLs are loaded into the process space of the container application. As a consequence, data does not need to be transported between the container application and the ActiveX control. In contrast, ActiveX executables are loaded into a separate process space from the container application. Since there is no shared memory between such applications, data is transported between ActiveX objects and the container application. This is advantageous in the sense that an ActiveX executable does not interfere with the processing of data in the client application.

Although a number of programming environments exist for facilitating development of ActiveX controls as object-oriented constructs, each such ActiveX control operates independently of the container application. That is, ActiveX controls are conventionally installed in container applications so as not to be affected by changes in parameters of the container application, and vice versa. Similarly, the occurrence of ActiveX events does not automatically cause the execution of scripts or the like in the container application.

Early remote control systems were designed to access and take over the local computer system and run them from a remote location, eliminating any other access and remote operation, as noted in Hyatt (U.S. Pat. No. 5,307,463) and Zapolin (U.S. Pat. No. 5,122,948).

Existing systems as typified by Slaughter (U.S. Pat. No. 5,598,536) permit accessing of data from a local controller system, for example, and the collection of data from the local controller data memory, such as, sensor and other data, as well as the sending of instructions to the controller to set or control certain switches.

Still other systems, as typified by Crater (U.S. Pat. No. 5,805,442), provide for the existence of controller-based web pages which are sent over the Internet and viewed in a browser which accesses the controller as a node on the Web.

Other systems as typified by the Mercury Project papers entitled "Desktop Teleoperation via the World Wide Web", and "Beyond the Web: Excavating the Real World Via Mosaic" which are attached hereto and incorporated herein by reference, show multiple servers which collect data, configure web pages and provide security features for communication and the exchange of control systems data with multiple clients on the Web.

Each of these systems uses the application running on the local system for control of the local control systems. The browser systems utilize the browser simply as a data input and display device which exchanges data and instructions with the local system.

However, heretofore there has not been a mechanism or system, which has permitted desktop bound programming to run on remote computer systems, in one or more instances without the need to rewrite the remote desktop application to run as a remote system and access data and instructions on a local control system.

SUMMARY OF THE INVENTION

The present invention is directed to a system and method for remote control by at least one controller for sending and receiving remote and local control system information wherein the controller gathers local control system information and transmits the local control information over at least one communication path to at least one remote computer system (client). A desktop bound program can be run on a remote computer utilizing remote data without changing the desktop software.

The client applications can be made to execute in any context that can host an ActiveX control. This has been accomplished by modifying the local runtime application, which in the specific embodiment is a window viewer, to become a local server and to provide an ActiveX control object to host the server.

The client application can be run from a browser or via the command line.

The remote computer system runs a remote software application and manipulates the transmitted local control information.

The remote control system information can be stored in the local computer's controller memory. Alternatively, the remote control system information can be stored in the remote computer's system memory.

The controller may contain one or more data handlers. Examples of data handlers include: a runtime database handler, an alarm data handler and a history data handler. Customized handlers can be created using a data handler toolkit.

The communication paths include secure (e.g., HTTPS) and non-secure (e.g., HTTP) paths. Multiple communication paths can be operable in a single session.

DESCRIPTION OF THE SPECIFIC EMBODIMENT

Figure 1:
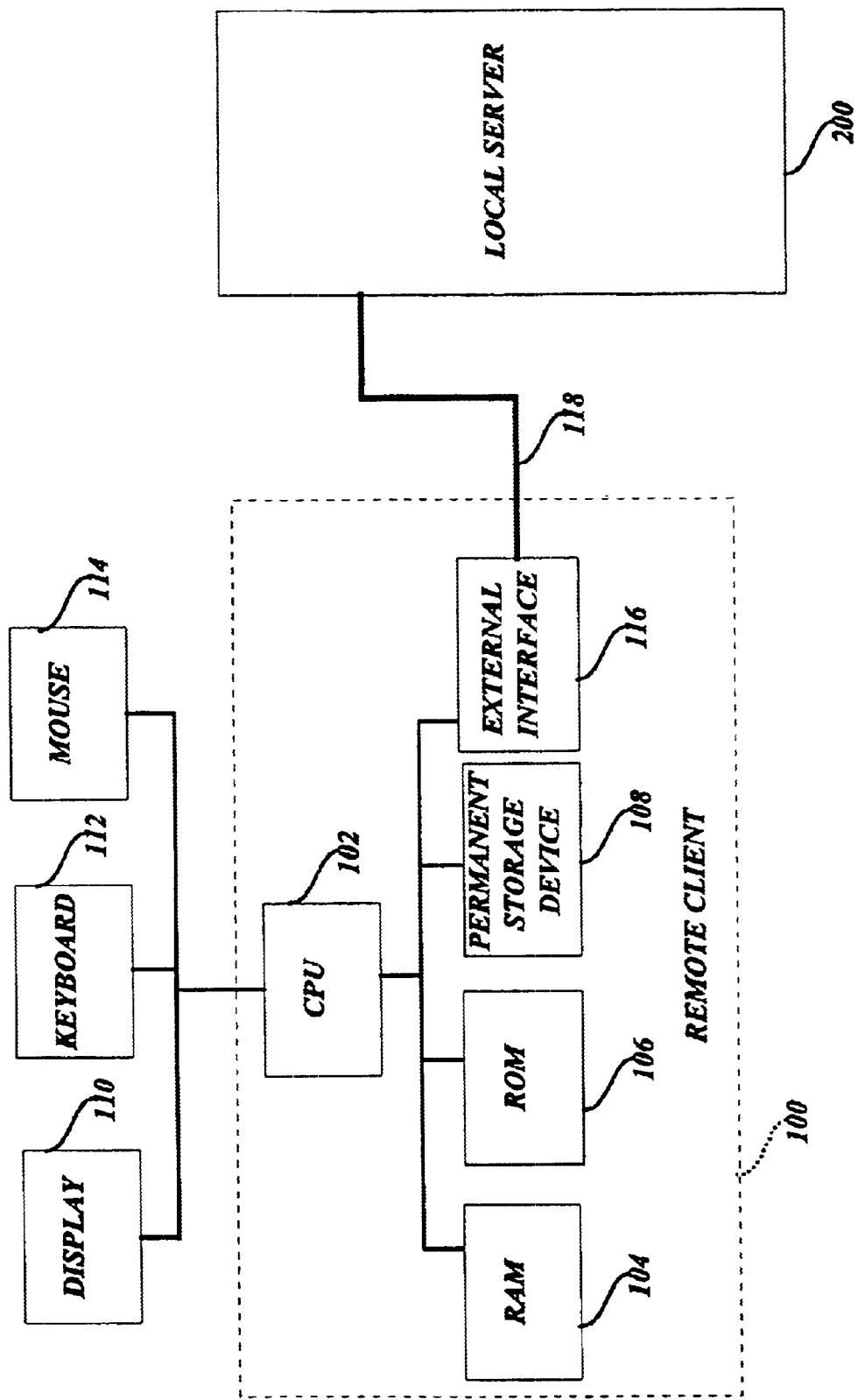
FIG. 1 is a block diagram of a computing environment suitable for implementing the present invention.

FIG. 1 illustrates a computing environment suitable for implementing the present invention. A remote client computer 100 communicates with a local server computer 200 over a communication medium 118. For example, the client 100 can communicate with the server 200 over the Internet.

The remote client computer 100 includes a central processing unit (CPU) 102. The client 100 also includes memory in the form of random access memory (RAM) 104 and read-only memory (ROM) 106. The client computer also includes a permanent storage device 108, such as a hard disk drive.

The client computer 100 also includes a display device 110, a keyboard 112 and a pointing device, such as a mouse 114. In one embodiment of the present invention, the client computer 100 runs a browser program.

It will be appreciated that many computing environments are suitable for implementing the present invention. For example, the client computer 100 may be a Personal Computer (PC) running various operating systems, for example, Microsoft NT, Windows 95 or Windows 98. It will also be appreciated that the client 100 contains many more components than those illustrated in FIG. 1, however it is not necessary to show all of theses components in order to disclose an illustrative computing environment suitable for implementing the present invention.

The server 200 contains similar components as those shown for the client computer 100. As with the client computer, additional components may be included. For example, the server may an NT Server version 4 or later running Internet Information Server version 4 or later.

IView Client/Server Framework

Figure 2:
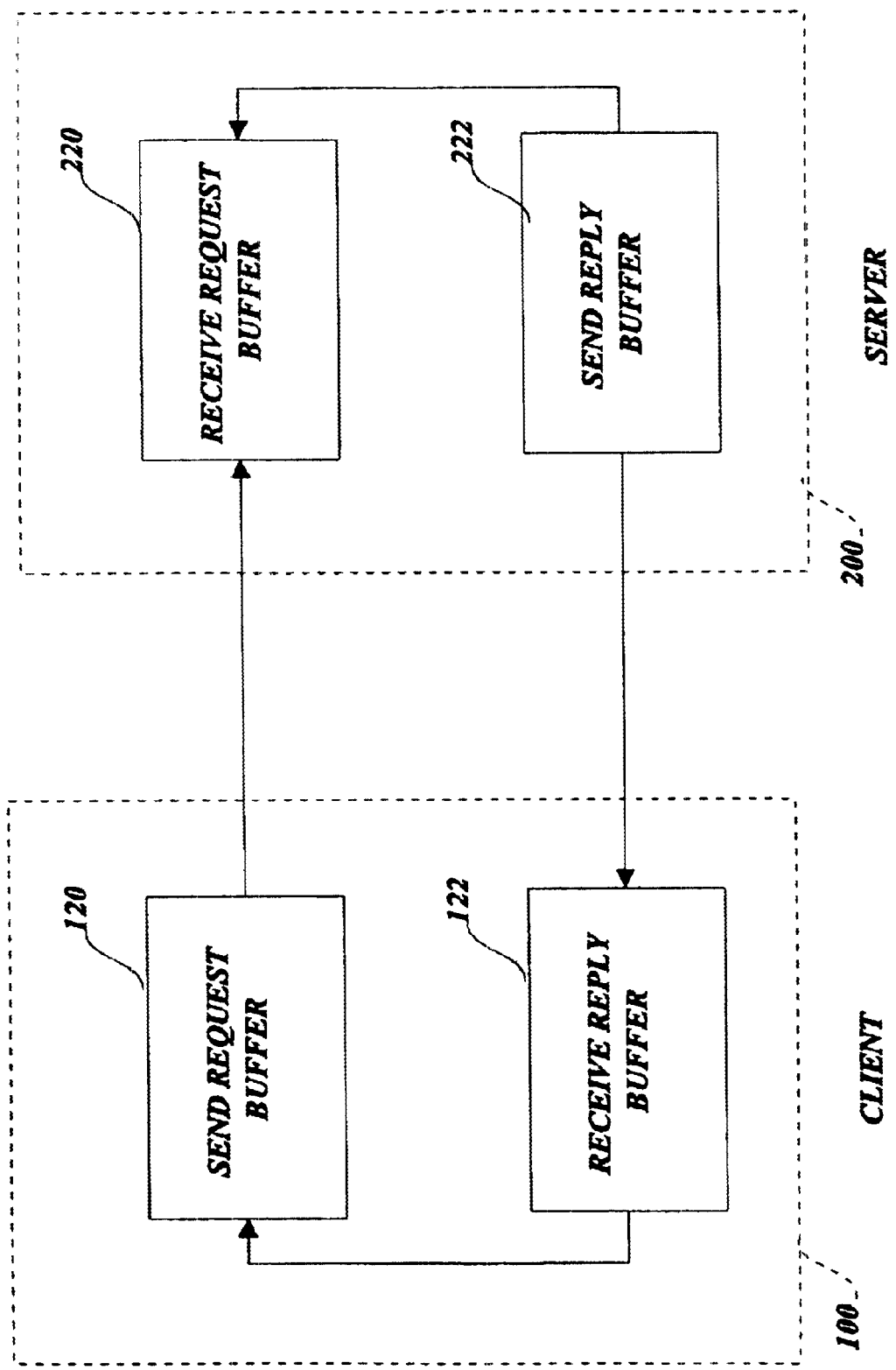
FIG. 2 is a high-level overview diagram of the transferring of data between a local server and a remote client performed in accordance with the present invention.

FIG. 2 is a high level diagram showing the transferring of data between a remote client 100 and a local server 200. When data is accessed, the client 100 fills a send request buffer 120 with a data request. After the send request buffer 120 is filled, it is sent to a receive request buffer 220 at the server 200 where the request is read by the server and a send reply buffer 222 is filled with the reply which is sent to the client receive reply buffer 122 where the reply is read by the client. The underlying framework protocol appends the necessary headers on transmission of the respective requests and replies and strips the headers on delivery. The requests/replies events take place in the context of a session, which must first be established before requests/replies are exchanged.

The Client/Server framework of the present invention, which is known as IView, supports accessing data through the World Wide Web primarily for any client written to the client abstraction application program interface (API). The framework consists of two components: (1) a Data Access Component and (2) a Data Handlers Toolkit.

A Data Client is a component or program written using the Data Access component. A client establishes a session and starts exchanging requests/replies over that session. The Data Access Component hides all details pertaining to HTTP, Proxies, SSL, and so on. In the particular embodiment described, there are three data clients: a Runtime Data Client, an Alarm Data Client and a History Data Client.

A particular Runtime Data Client component is the Client Abstraction Layer which is an API that abstracts the communication with input/output (I/O) Servers over Dynamic Data Exchange (DDE) and other custom links that may be present. This layer relies on parameter definitions to choose between DDE and the other custom links. In the instant invention, this layer is augmented by one more protocols (HTTP Tunneling) to support accessing local runtime data over HTTP.

The Alarm Data Client is an alarm program that uses the service of the Data Access Component directly to gain access to local alarm data over HTTP. The History Data Client is a history program which uses the service of the Data Access Component to gain access to local history data over HTTP.

Figure 3:
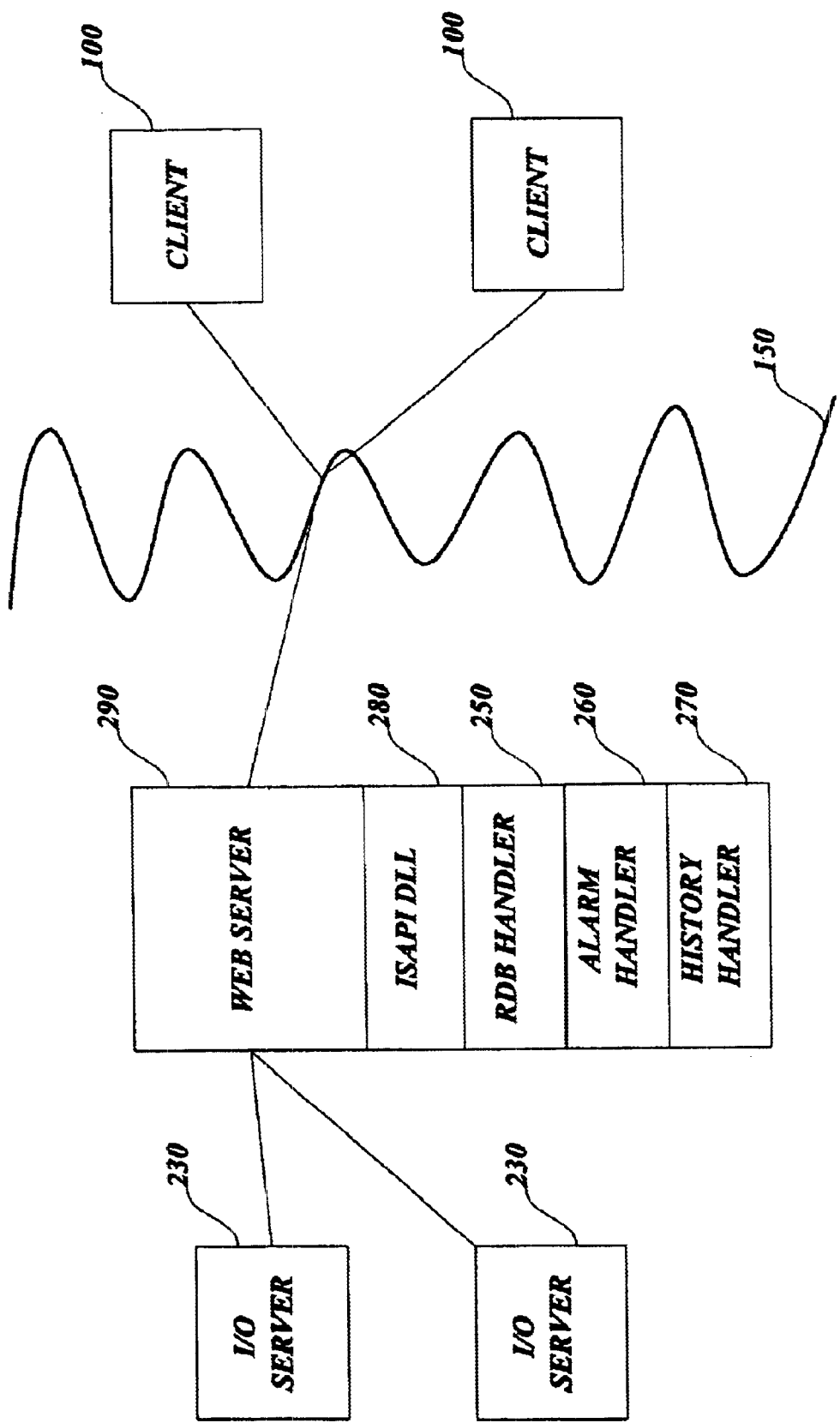
FIG. 3 is an architecture diagram of the main components of the present invention.

In order to process the data accessed, data handlers must be developed. A data handler is a component written using a Data Handler toolkit in order to expose any data to Web clients. There are currently three handlers available which handle the data for the three clients. The existing data handlers are shown in the architecture diagram of FIG. 3 and include:

1. a Runtime Database Handler (RDB) Handler 250 which exposes IOServer or runtime data to any client that. uses the Client Abstraction Layer and supports DDE and other protocols;
2. an Alarm Handler 260 which exposes alarm data from the host to the client, as well as any other client that uses the Client Abstraction Layer; and
3. a history Handler 270 which exposes history data from the host to any client that uses the Client Abstraction Layer.

A typical Data Handler would respond to the following events:

Session creation (client context);

Requests via the created sessions;

Session deletion; and

Session timeout.

The data handler is run as an NT service. The data handlers receive data requests via an Internet Server Application Program Interface (ISAPI). The data handler retrieves the data from the appropriate I/O server 230 and forwards it to the ISAPI DLL 280. The ISAPI forwards the data to the appropriate client 100. The data may be transmitted from the ISAPI 280 to the client 100 via a Web browser 290 over the Internet 150.

While the disclosed embodiment contains three data handlers, (runtime database handler alarm handler and history handler), it will be appreciated that other data handlers can be used instead of or in addition to these data handlers.

Flow Logic

Figure 4:
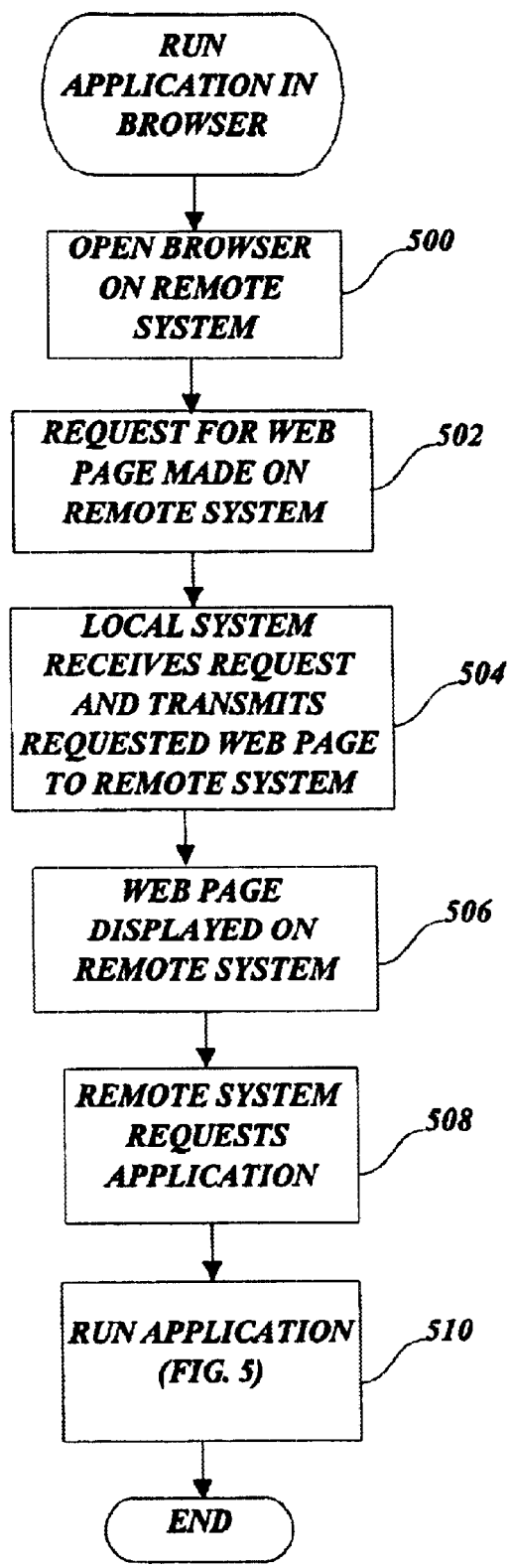
FIG. 4 is a flow diagram illustrating the overall logic for running an application in a browser window in accordance with the present invention.

FIGS. 4–7 are flow diagrams illustrating the logic of the present invention. FIG. 4 is an overall flow diagram of the logic of running a remote client application in a browser. The logic of FIG. 4 moves from a start block to block 500 where a browser is opened on a remote system. The remote system is client computer 100. Next, in block 502, a request for a Web page is made using the browser. For example, a hyperlink is selected. The local system, i.e., server 200, receives the request from the client 100 and transmits the requested Web page to the client for display in the browser. Upon receipt of the Web page, the logic moves to block 506 where the client 100 displays the received Web page. For example, the Web page may be a list of applications that the client can run. The list may be a list of hyperlinks. Next, in block 508, the client selects an application to run. Finally, in block 510, the requested application is run as illustrated in detail in FIG. 5 and described next. It will be appreciated that the logic shown in FIG. 4 is standard browser processing. The key feature of FIG. 4 with respect to the present invention is that at some point (block 508 of FIG. 4), the remote user selects an application for execution via the Web browser.

Figure 5:
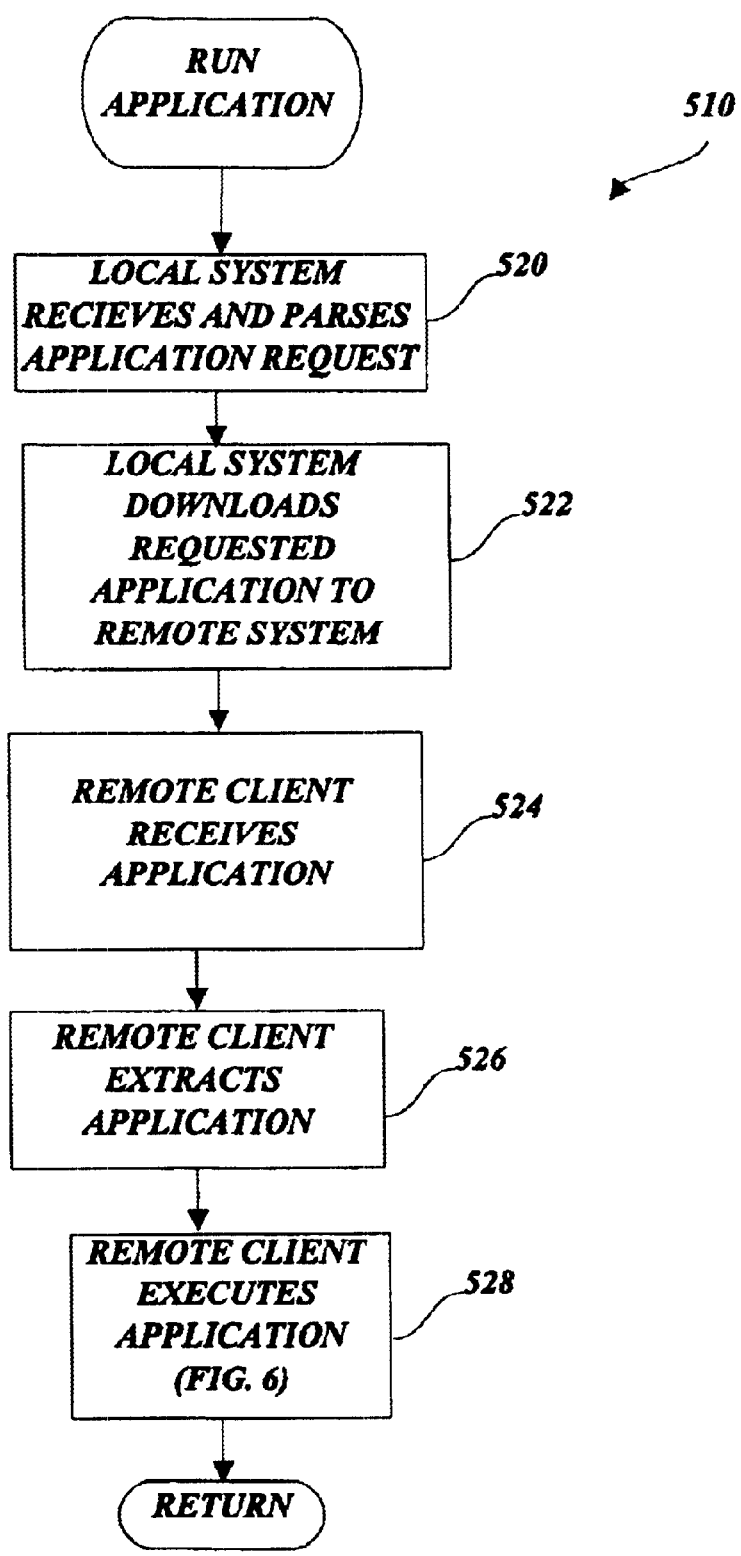
FIG. 5 is a flow diagram illustrating in detail the logic of running an application.
Figure 6:
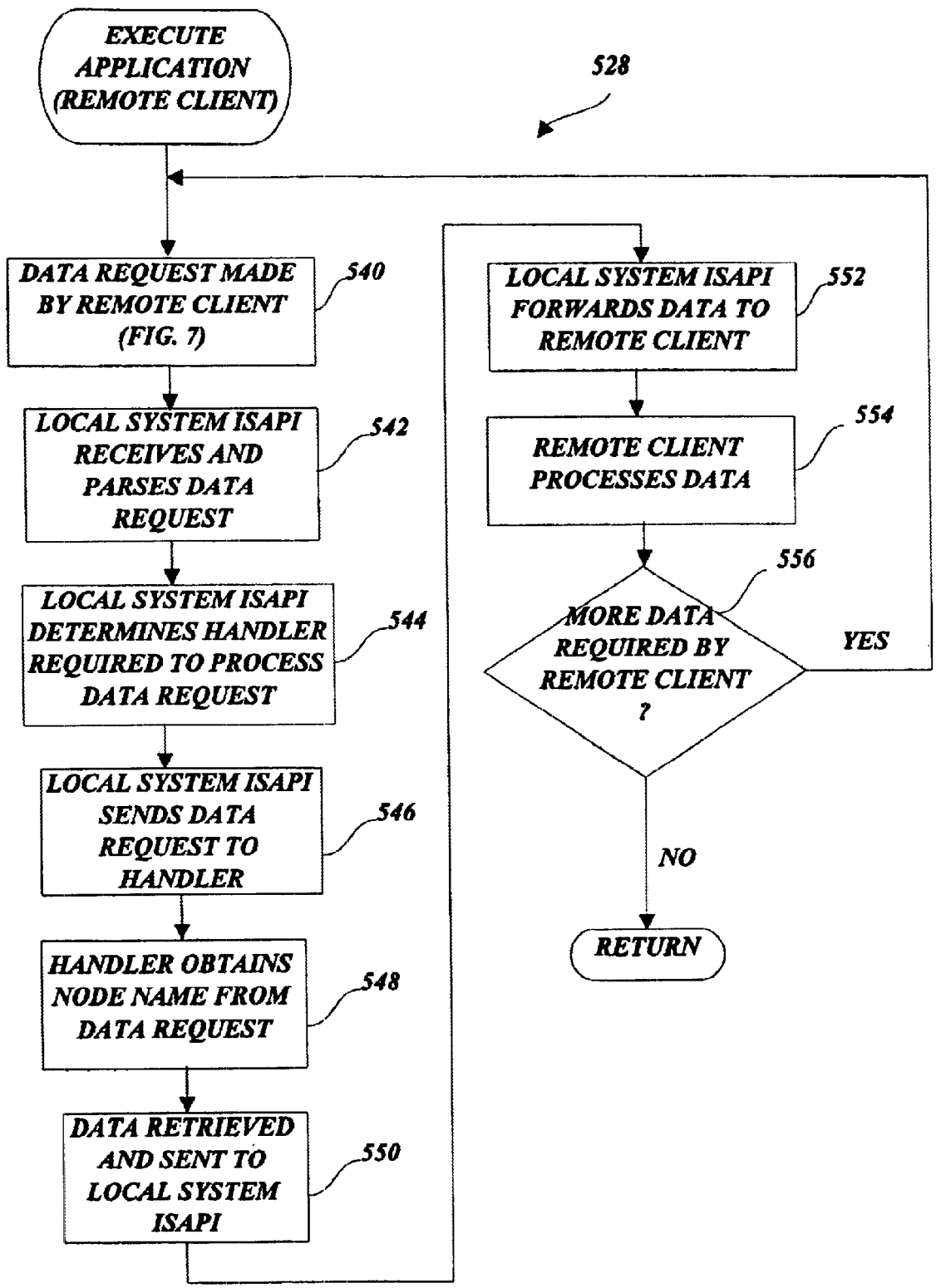
FIG. 6 is a flow diagram illustrating in detail the logic of a remote system executing an application.

FIG. 5 illustrates in detail the logic of running an application. The application can be run in a browser, as illustrated in FIG. 4. Alternatively, the application can be run from a command line. The logic of FIG. 5 moves from a start block to block 520 where the system, i.e., server 200, receives and parses the client request to run an application. The system downloads the requested application to the remote system, i.e., client 100. See block 522. Preferably, the application is compressed and downloaded as zip files. Next, in blocks 524 and 526, respectively, the remote system receives and extracts the application. Next, the remote system executes the application, as shown in detail in FIG. 5 and described next.

The logic of FIG. 5 of executing an application moves from a start block to block 540 where the remote system makes a data request, as shown in detail in FIG. 7, and described later. Next, in block 42, the ISAPI receives and parses the data request. The ISAPI then determines the data handler required to fulfill the data request. See block 544. The ISAPI then sends the request to the appropriate data handler. The data handler then obtains the node name from the request. The node name specifies the I/O server from which the requested data should be obtained. See block 548. The data handler then retrieves the data from the node and sends it to the ISAPI. See block 550. Next, in block 552, the ISAPI sends the data to the client 100. Next, in block 554, the client receives and process the data. Processing the data includes parsing the data and displaying it. Next, in decision block 556 a test is made to determine if more data is required. If so, the logic returns to block 540 where the remote system makes a data request. If not, the logic of FIG. 6 ends, and processing returns to FIG. 5. In this manner, data requests are repeatedly processed until termination of the application program.

Figure 7:
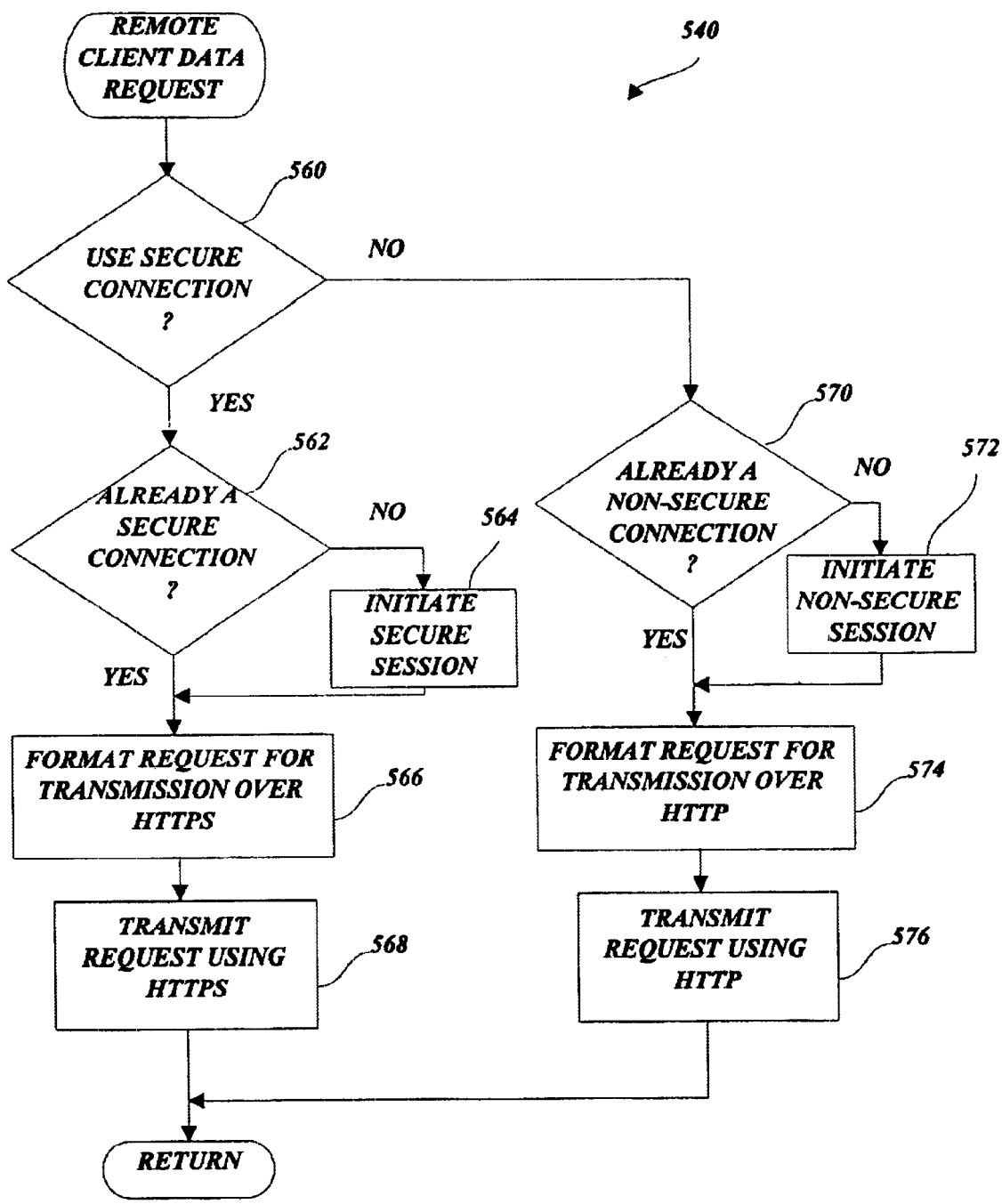
FIG. 7 is a flow diagram illustrating in detail the logic of the remote system making a data request.

FIG. 7 illustrates in detail the logic of making a data request. First, in decision block 560 a test is made to determine whether a secure connection should be used. This information is determined by the application program and is contained in the data request. The data request contains a tag for each piece of data requested. The tag includes an application name, a topic and a node. The present invention-uses a special form of node tag designed to run over the Internet. The node tag is of the form: application@<web_server_ip>. Also included in the data request is a handler string which specifies the handler that should be used for obtaining the data, for example, "RDB", "history" or "alarm". If a secure connection is to be used, the logic moves to decision block 562 where a test is made to determine whether a secure session already exists. If not, a secure session is established in block 564. The request is then formatted and transmitted using HTTPS over the existing or newly established secure connection. See blocks 566 and 568, respectively. If in decision block 560 it is determined that a secure connection should not be used, then a non-secure connection will be used. Accordingly, the logic moves to decision block 570 where a test is made to determine whether a non-secure session already exists. If not, the logic moves to block 572 where a non-secure session is initiated. Next, the logic moves to block 574 where a request is formatted. The formatted request is then transmitted over the existing or newly created non-secure session using HTTP. See block 576. The logic of FIG. 7 then ends, and processing is returned to FIG. 6.

Figure 8:
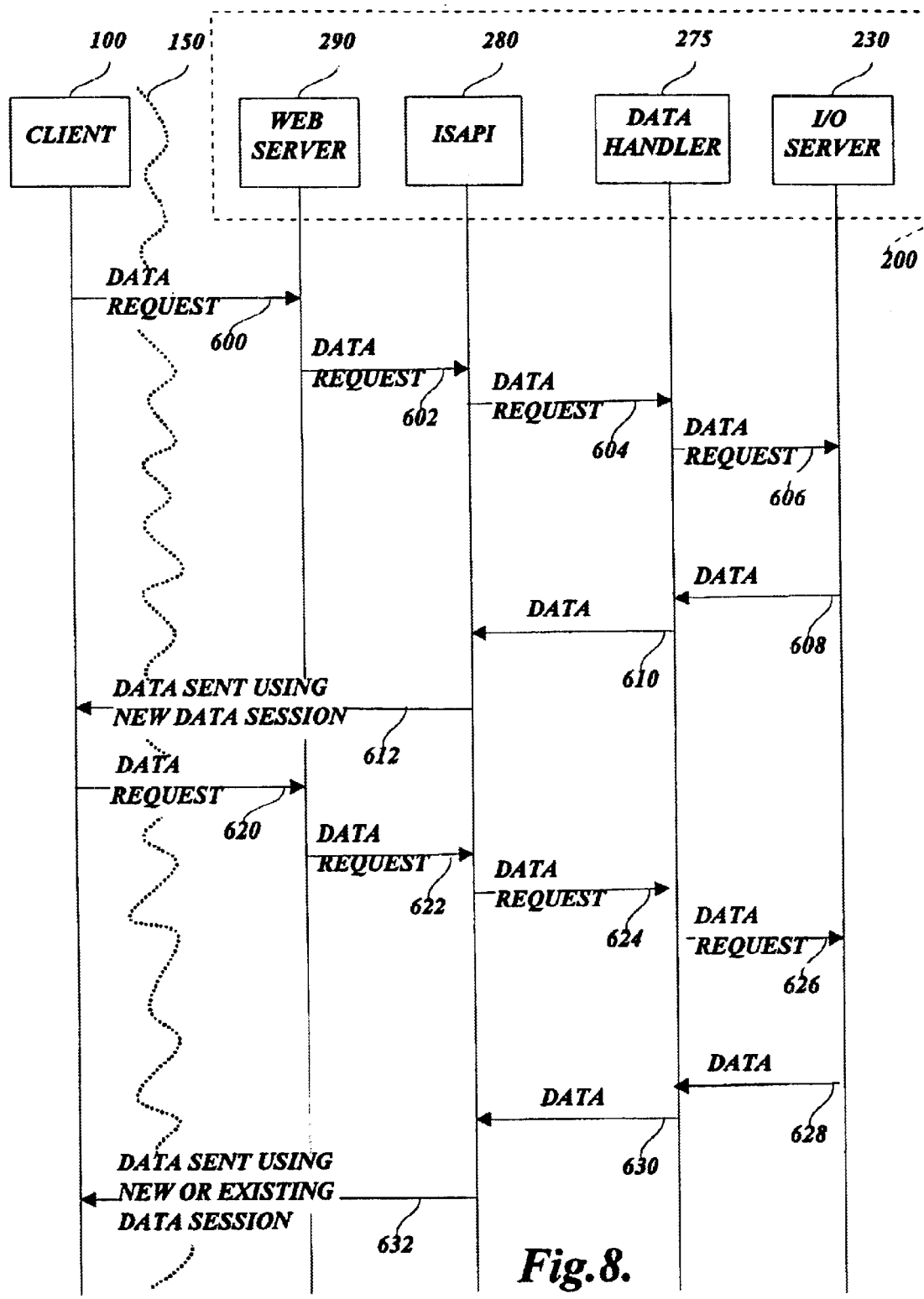
FIG. 8 is a message diagram showing the primary data flow between the major components of the present invention.

FIG. 8 is a message sequence diagram showing the primary flow of data among the major components of the present invention. A first data request 600 is initiated by the client 100. The data request is transmitted over the Internet 150 to the Web server 290. The Web server forwards the data request 602 to the ISAPI 280, which in turn forwards the request 604 to the. appropriate data handler 275. In the embodiment described herein, the data handler may be a RDB handler 250, an alarm handler 260 or a history handler 270. It may also be another data handler. The data handler 275 requests the data 606 from the appropriate I/O server 230. The requested data 608 is then transmitted from the I/O server 230 to the data handler 275. The data handler 275, in turn, forwards the data 610 to the ISAPI 280. The ISAPI 280 then forwards the data to the client 100 using a new data session. The data session can be a secure data session which uses HTTPS or a non-secure session which uses HTTP.

A subsequent data request 620 is transmitted from the client 100 to the Web server 290. The second data request follows the same data path as the first data request. That is, the data request 622 is forwarded from the Web server 290 to the ISAPI 280. The data request 624 is then forwarded from the ISAPI 280 to the appropriate data handler 275. The data request 626 is then forwarded from the data handler 275 to the I/O server 230. The I/O server 230 sends the requested data 628 to the data handler 275. The data handler 275 then sends the data 630 to the ISAPI 280. The ISAPI 280 determines whether there is an existing session of the required type (i.e., secure or non-secure) over which the data can be transmitted. If there is an existing session of the proper type, the data 632 is transmitted to the client 100 using the existing session. If there is no existing session of the proper type, the data 632 is transmitted to the client 100 using a new session. Performance is boosted by using existing sessions rather than creating new sessions. Existing sessions can be shared by multiple data handlers. For example, the ISAPI 280 can send data from an RDB handler 250, an alarm handler 260 and a history handler 270 to a given client 100 using a single session.

An Illustrated Example

Figure 9:
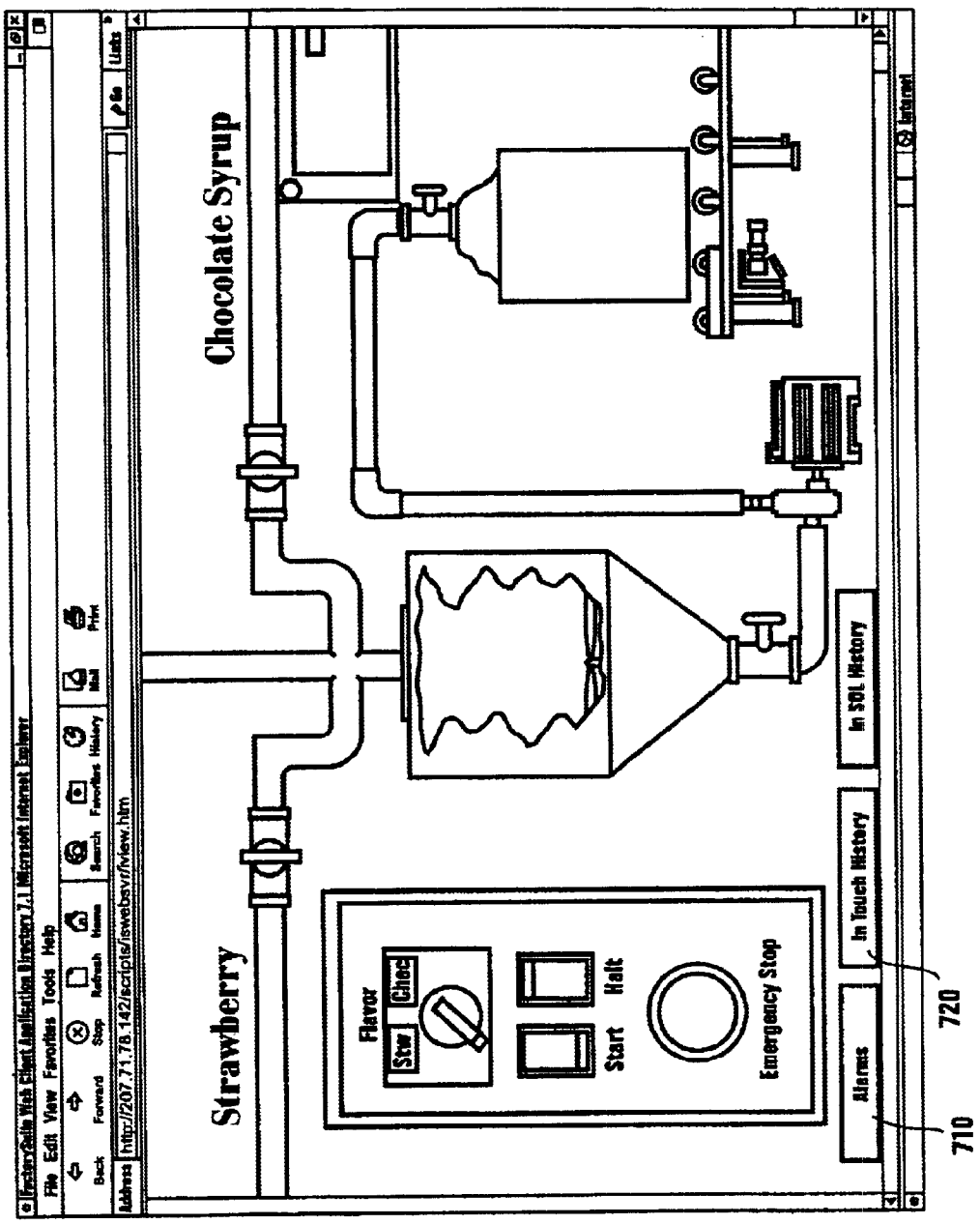
FIG. 9 is an exemplary user interface display of the present invention.
Figure 10:
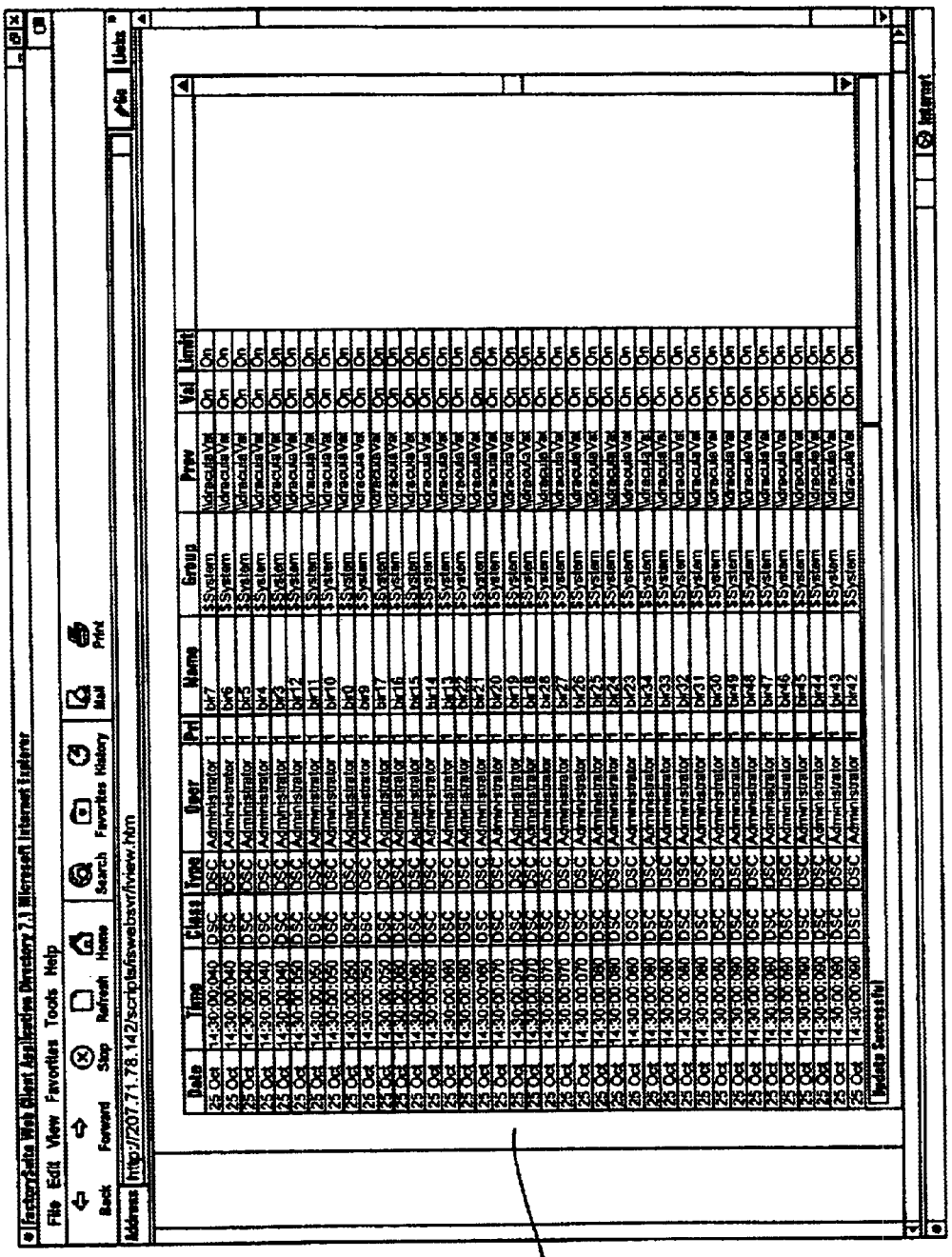
FIG. 10 is an exemplary user interface display shown in response to selection of the Alarm option of the exemplary user interface shown in FIG. 9.
Figure 11:
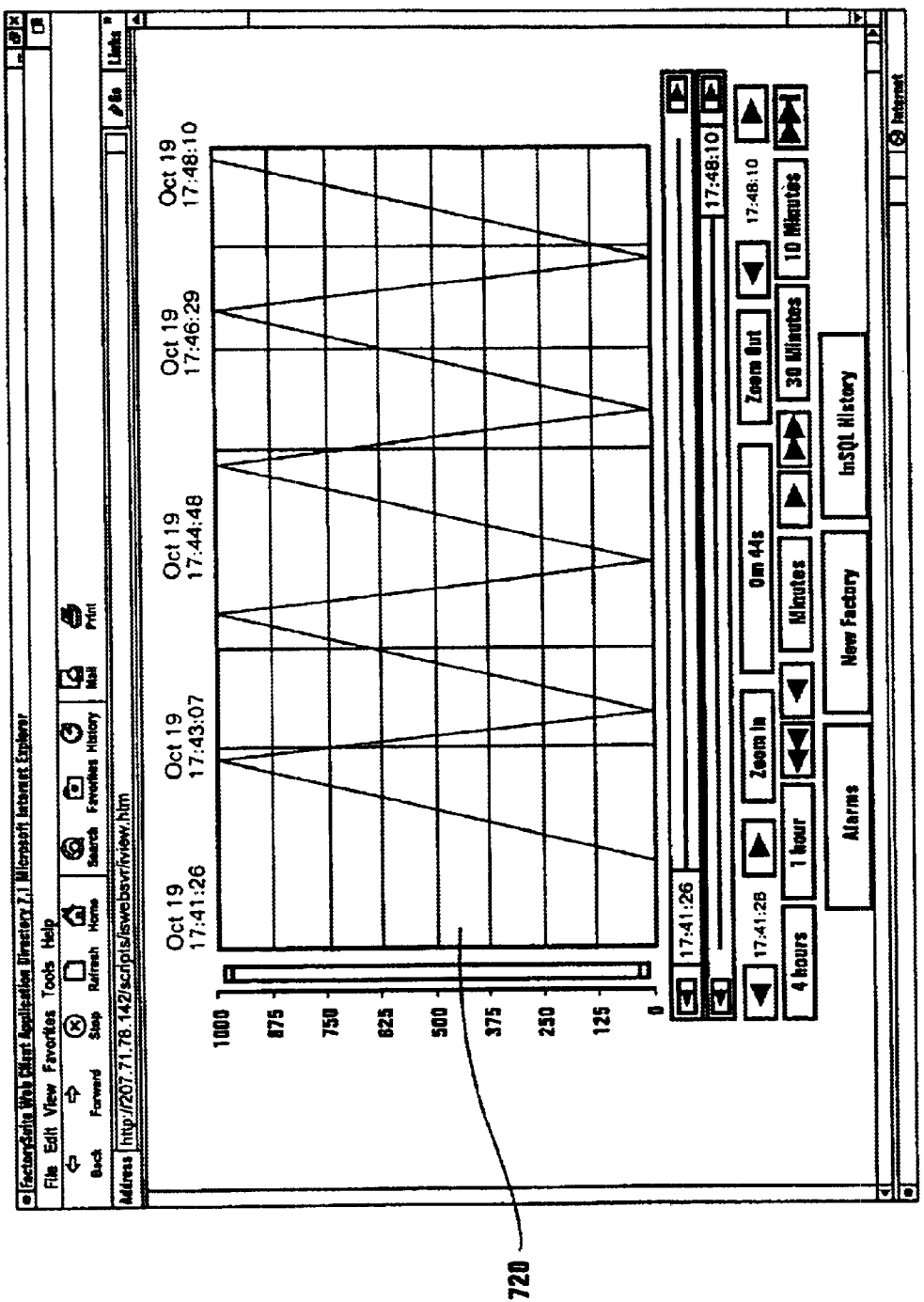
FIG. 11 is an exemplary user interface display shown in response to selection of the History option of the exemplary user interface shown in FIG. 9.

FIGS. 9–12 illustrate exemplary user interfaces displayed on the client's display 110. As described earlier, the user interface may appear in a browser window or in its own application window. FIG. 9 illustrates a user interface which includes runtime data 700 which is provided by the runtime database handler. Also included are an Alarm button 702 and a History button 704. If the user depresses the Alarm button 702, the Alarm display shown in FIG. 10 is displayed. The Alarm display shows alarm data 710 provided by the Alarm handler. If the History button 704 is depressed, the History display shown in FIG. 11 is displayed. The History display shows displays historical data 720 provided by the History handler.

Figure 12:
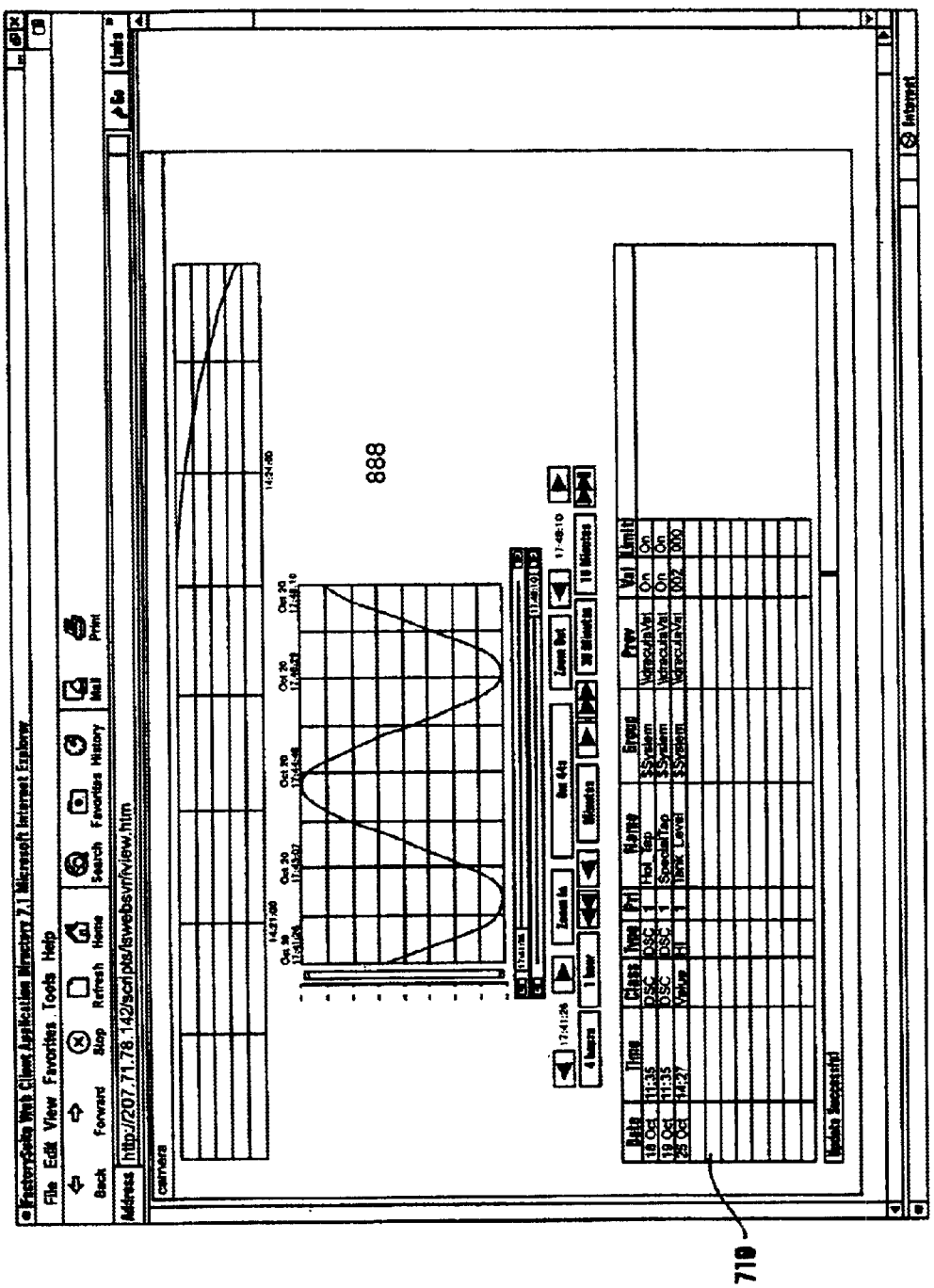
FIG. 12 is an alternative user interface which combines the data shown in FIGS. 9–11 in one user interface display.

FIG. 12 illustrates an alternative user interface to the user interface shown in FIGS. 9–11. The user interface shown in FIG. 12 displays the runtime data 700, the alarm data 710 and the history data 720 in a single window.

HTTP Tunneling Protocol

A special data client component is the Client Abstraction Layer which is an API that abstracts the communication with I/O Servers over DDE and SuiteLink. This layer relies on parameters to choose between DDE and SuiteLink. For the IView, this layer is augmented by one, more protocol (IView HTTP Tunneling) to support accessing runtime data over HTTP.

The protocol is an abstraction over HTTP and allows a client to establish a session with a specific handler. A handler is identified by the form, {URI, HandlerName} where the URI (Uniform Resource Indicator) is of the form "http[s]:// [user]:[password]:server:[port]" with the parameters in square brackets being optional. The first parameter, "s," signifies whether or not this connection will be using SSL. The user and password parameters work together and allow for server side authentication of the client using standard Windows NT security. The server parameter can either be the machine's Internet Protocol (IP) address or its fully qualified domain name, such as, "www.mycompany.com." The last parameter, "port," tells the client which port to connect to on the server with the default being "80," the standard for HTTP connections.

The session serves as a context identifier between the handlers and client. For the handlers, the session id is the client context. A client may establish as many sessions as it needs. Sessions are determined based on the specific data sought. The data fields at the local server contain property definitions which define the type of session to be used. The session API allows the user to specify extra information for the requests/replies that could be used for dispatching purposes.

Figure 13:
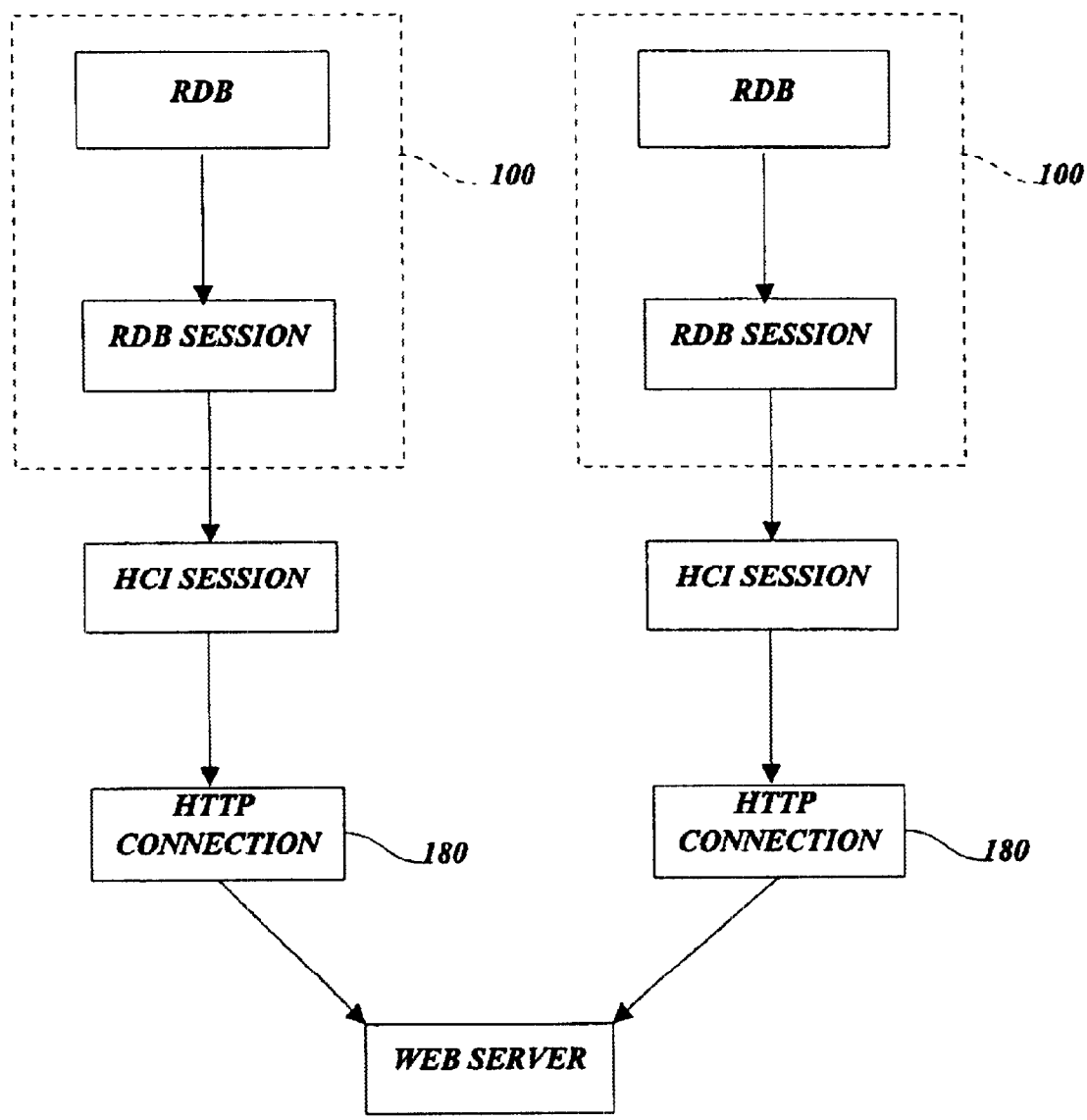
FIG. 13 is an example illustrating two sessions for one client, one HTTP session and one HTTPS session.

For example, as shown in FIG. 13, a client 100 using the Client Abstraction Layer could make a connection using HTTP 180 for a few data points. That same client could then make another connection for other data points using HTTPS 182. This client would then have two sessions, as well as two connections. The second session is established because the method of connection has changed from HTTP to HTTPS as defined by the data properties.

Figure 14:
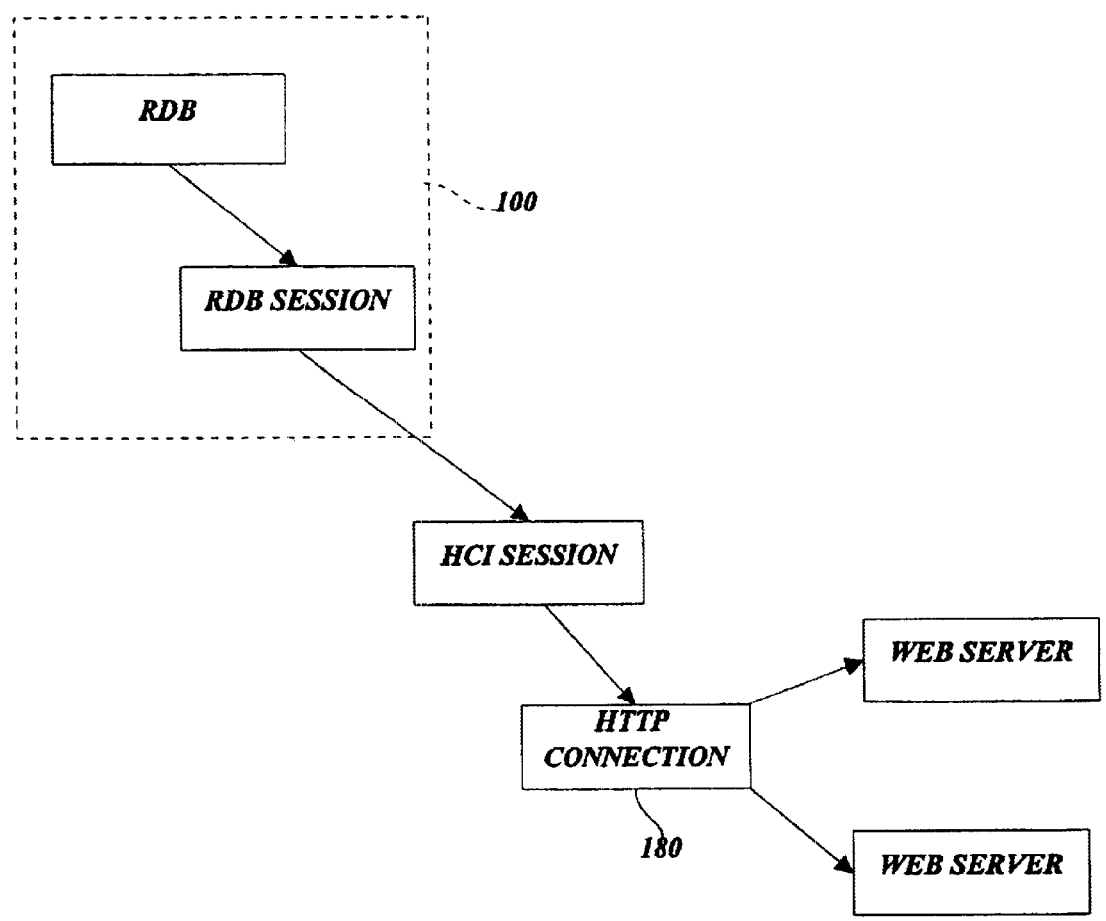
FIG. 14 is an example illustrating two HTTP connections for one client that are funneled through a single session.

In another example, shown in FIG. 14, a client 100 makes a connection using an HTTP to server A for a set of data points. The client then makes a second HTTP connection to server B for a second set of data points. This client has two HTTP connections, which are funneled through one session.

Figure 15:
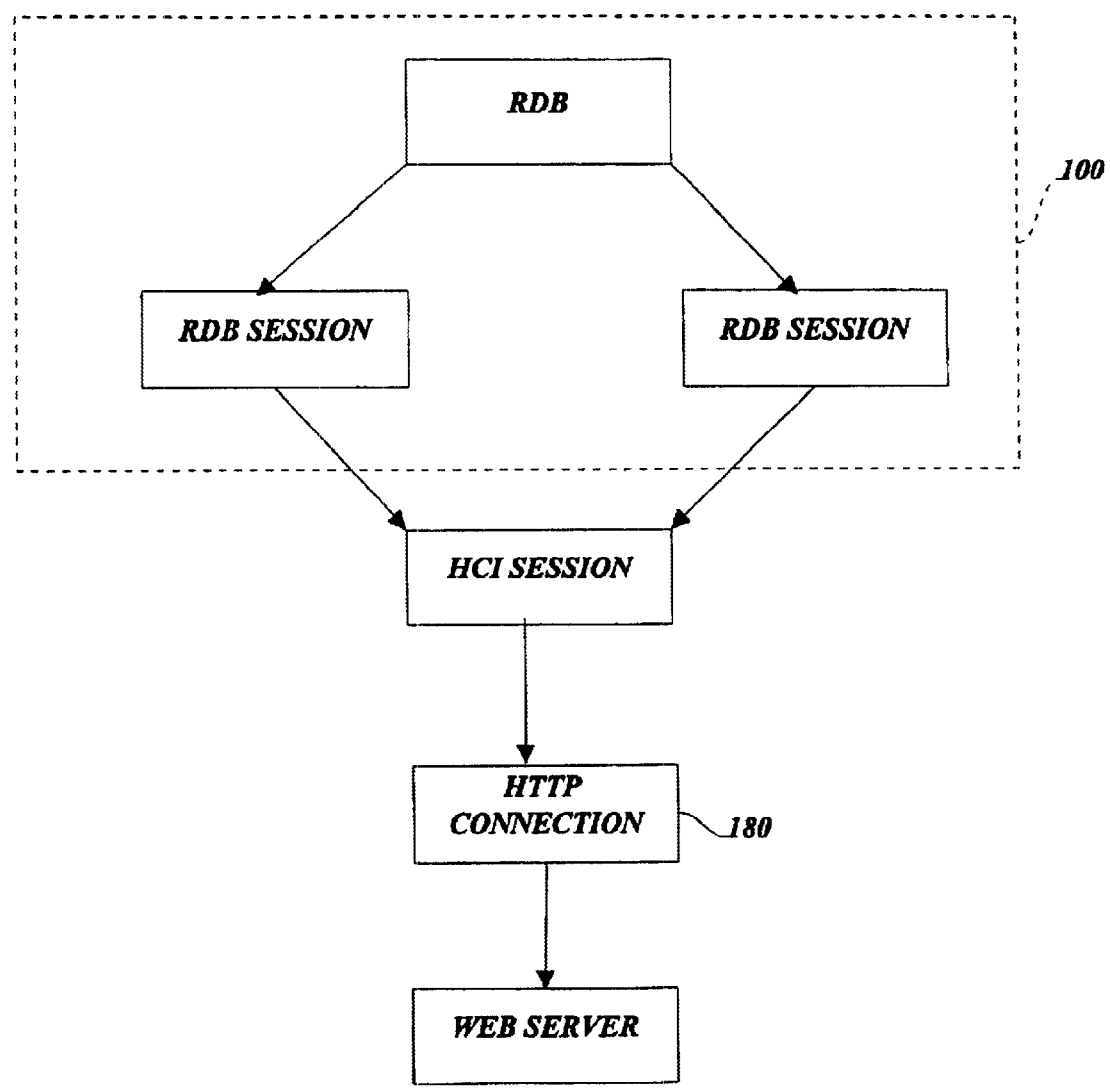
FIG. 15 is an example of a client with two sessions each with an HTTP connection for a different username/password.

In a third example, shown in FIG. 15, a client 100 makes an HTTP connection for a set of data points that requires a username and password. The client then makes a second HTTP connection for another set of data points that requires a different username and password. This client then has two sessions and two HTTP connections.

The Data Access component establishes one or more HTTP connections to serve the sessions. The Data Access Component abstracts the details of HTTP connections from the session. Fault tolerance is built in to allow the sessions not to be aware that an HTTP connection was lost and another one was established. From the standpoint of clients and handlers, requests are sent and replies are received in the form of buffers, as shown in FIG. 2.

From the framework standpoint, the Data Access Component established HTTP connections to a Web server. Requests received by the web server are delegated to an ISAPI which dispatches the requests to the correct handler and then forwards the replies back to the clients. The Data Access Component serializes the client requests into packets and prepends a header used later by the ISAPI in order to dispatch the requests to the correct handler. By the same token, the ISAPI serializes the replies and prepends a header for proper dispatching to the correct session. The data access component uses polling in order to send requests and receive replies. Session requests are queued and then on the next polling interval everything is sent and the replies to previous requests are picked up.

This invention allows existing client applications to run in the context of an Internet Browser without modification by the original developer. In fact, the client applications can be made to execute in any context that can host an ActiveX control. This has been accomplished by modifying the local runtime application, which in the specific embodiment is a window viewer (view.exe), to become a local server and to provide an ActiveX control object to host the server. Normally the local window viewer is launched via an icon on the desktop or through the command line. Once modified to be a local server, the window viewer can be launched via techniques well known to COM and Distributed Component Object Model (DCOM) programmers. Thus, the instant invention provides a general technique for allowing desktop bound applications to be available over the Internet. This permits the remote system desktop bound application to send and receive data to and from a local site on the Internet.

Local Server Support

This invention involves the creation of a library called VIEWLS.LIB that is linked to the existing local legacy code base. The purpose of this library is twofold: (1) to provide an implementation for local server services; and (2) to provide an IDispatch based interface for interaction with the ActiveX control. Local servers are required to support three command line switches: (1) /RegServer, (2) /UnregServer, and (3) /Embedding. The legacy code has been modified to look for each of these switches and to call into this new library for proper handling if any of these switches are found.

The implementation of "/RegServer" results in registry entries being created. These entries are sufficient for COM to locate and launch the local server. The implementation of "/UnregServer" removes the registry entries created by "/RegServer." The implementation of "/Embedding" results in the registration of the class object. COM requires a class object in order to create an instance of the COM object. In the case of "/Embedding" the local legacy code has been modified to bypass its normal initialization sequence. Instead, the host ActiveX control will call a method in the IDispatch based interface to do the initialization.

The IDispatch based interface, identified by IID_DIViewLS, provides methods for manipulating the legacy code. The methods in this interface are as follows:

SetApplicationDirectory: This method accepts the path that defines the directory for the client application. WindowViewer has a feature that allows it to run any client application that appears on the command line. If no such directory is present, it defaults to the last known client application. The argument to the method is used to create a command line that is handed off to WindowViewer. The WindowViewer, when run in the context of the Internet Browser is not constrained to use the application that would load if it had been run from the desktop. The "normal" behavior for WindowViewer is to run the application that has been specified on the command line. If no application appears there, WindowViewer will read some initialization (.INI) file settings to determine which application to launch. The .INI file settings keep track of the last application run. The present invention makes use of this feature and adds the application selected off of the Web page to the command line of the local server. Thus, the Web page is able to launch any application that has been downloaded to the computer without requiring extensive changes to WindowViewer. An additional benefit is that the desktop user's last application is not changed because WindowViewer, when running as a local server, does not modify these settings.

SetIPAddress: This method accepts the IP Address for the local server. This parameter is then used in the legacy, i.e., existing, code to provide an ambient property in the ActiveX control container. This property allows controls that have been made aware of the property to gain access to the local server's IP Address. The mechanism that the ActiveX control uses to define the values used in the connection call include this method, as well as the SetUser and SetPassword methods.

SetUser: This method accepts the user name for the local server. This parameter is then used in the legacy code to provide an ambient property in the ActiveX control container. This property allows controls that know about it to gain access to the appropriate user name.

SetPassword: This method accepts the password for the user specified in the SetUser method. This method is then used in the legacy code to provide an ambient property in the ActiveX control container. This property allows controls that know about it to gain access to the appropriate password.

CreateServerWnd: This method allows another path into the initialization sequence for WindowViewer. If the "/Embedding" command line argument is present, the normal initialization sequence will be bypassed. If this happens, WindowViewer will not be initialized and will be unable to operate correctly. The expectation is that the hosting ActiveX control, which is part of this invention, will call this method. The implementation of this method fully initializes WindowViewer and creates the main window of the application by calling existing initialization functions in the legacy code. This method should not be called until all parameters are correctly defined. This allows the Web page to initialize the ActiveX control before continuing the initialization of the local server. The parameters to this method include size, position, window style, and parent handle. The handle of the created window, which is the main application window of WindowViewer, is returned via another parameter. Thus, the controlling ActiveX control has access to the main application window created by the local server.

GetWindowList: This method retrieves all the windows that are in the client application by name. The parameters to this method are used to return the created selection list and a count of the items on that list.

ReleaseWindowList: This method releases all windows retrieved by GetWindowList. The parameter to this method is the selection list.

GetWindowNameAndIndex: This method retrieves information specific to a window. The input parameters to this method are the selection list and sequence index. Two output parameters return the string name of the window and the window index, which is different from the sequence index.

The Interface Definition Language (IDL) for this interface is set forth below:

```
[object, oleautomation, dual,
uuid(C8947A20-E9CD-11d1-B158-00A0C95AC277)]
interface DIViewLS:IDispatch
{
    [helpstring("Set Application Directory")]
    HRESULT SetApplicationDirectory([in] BSTR
    sZApplicationDirectory);
    [helpstring("Set IP Address")]
    HRESULT SetIPAddress([in] BSTR szIPAddress);
    [helpstring("Set User")]
    HRESULT SetUser([in] BSTR szUser);
    [helpstring("Set Password")]
    HRESULT SetPassword([in] BSTR szPassword);
    [helpstring("Create Server Window" )]
    HRESULT CreateServerWnd
    (
        [in] LONG      Size_cx,
        [in] LONG      Size_cy,
        [in] LONG      Pos_cx,
        [in] LONG      Pos_cy,
        [in] ULONG     Style,
        [in] ULONG     hwndParent,
        [in] ULONG     id,
        [Out] ULONG*   phwnd
    );
[helpstring("Get list of windows within the application")]
    HRESULT GetWindowList
(
[out] ULONG* pWindowList,
[out] ULONG* pCount
);
[helpstring("Release list of windows within the application")]
    HRESULT ReleaseWindowList([in] ULONG WindowList);
    [helpstring("Get name of specific window within the application")]
    HRESULT GetWindowNameAndIndex
(
[in] ULONG WindowList,
[in] ULONG SequenceIndex,
[out] BSTR* pWindowName,
[out] ULONG* pWindowIndex
);
};
```

The local runtime code is made capable of determining whether it is running as a desktop application or in the context of the associated ActiveX control by the introduction of a global variable that contains the application directory, user name, password, a flag to indicate whether or not it is running as a local server, size, position, style, parent handle, id, and main window handle. At any point in the legacy code where behavior in the browser should differ from behavior of a desktop application this global variable is consulted to determine the execution context.

Thus, when running in the context of a local server, the startup code displaying the splash screen is omitted and code that sets the style for the main window is omitted. (The style is set by the controlling ActiveX control via the CreateServerWnd method.) Therefore, when the WindowViewer runs in the context of an Internet Browser, no trace is left behind.

Two new command messages are included in the main window procedure for WindowViewer that allow various windows to be loaded and unloaded. The single parameter to these new command messages is a window index. This index is cached by the ActiveX control and was obtained through the use of the method GetWindowNameAndIndex which is exposed by the local server.

Command line processing was modified to look for "/RegServer", "/UnregServer", and "/Embedding". When any of these switches is found it calls into a function provided by VIEWLS.LIB to provide the implementation.

ActiveX Control

Another new feature of this invention is a particular ActiveX control, VIEWCTL.OCX that serves as the context for execution. Essentially any program that can host an ActiveX control, for example, an Internet Browser, VB, etc., can be a WindowViewer host. The hosting program creates an instance of VIEWCTL.OCX and when created it causes an instance of the local server to be created. Once the local server is created, the OCX call, CreateServerWnd method, is exposed by the local server. It takes the resulting window handle and makes it a child of the OCX. This results in the local server's window reacting to the things that happen to the screen area associated with the OCX. For example, if the OCX is minimized, the server window is also minimized. If the OCX is moved, the server window is also moved. When the OCX is closed, the server window is also closed.

The user interface presented by the OCX allows the remote user to show and hide windows as desired. If the application has been created with its own internal window management, the OCX can be configured to not show the browser navigation frame. Once the user has selected and displayed a window, the user interacts with the window as if it were on the remote desktop.

The IDispatch based interface, identified by IID_DIViewLS, provides the methods for manipulating the legacy code. The properties in this interface are as follows:

GetWindowSets: This property returns an enumerator for windows that are part of the client application.

NavigationFrame: This property determines whether or not the ActiveX control displays a frame filled with window names on the left side of the display. This is a useful feature when the client application does not provide any navigation mechanism. If the frame is enabled, it can be reduced in size because it is based on splitter window technology.

The methods in this interface are as follows:

ShowWindow: The parameter to this method is the name of the window. The implementation will send a command message to the local server window, which results in the window being loaded and displayed.

HideWindow: The parameter to this method is the name of the window. The implementation will send a command message to the local server window, which results in the window being hidden.

SetApplicationDirectory: The parameter to this method is the path to the client application. The implementation will call into the local server to set the value in the global variable introduced by VIEWLS.LIB.

CreateServerWindow: There are no parameters to this method. The implementation results in a call into the local server to create the main window for WindowViewer and to fully initialize it.

SetIPAddress: The parameter to this method is the IP Address for the machine. The implementation calls into the local server to set this value.

SetUser: The parameter to this method is the user id to be used. The implementation calls into the local server to set this value.

SetPassword: The parameter to this method is the password for the specified user. The implementation calls into the local server to set this value.

The IDL for this interface is set forth below:

```
[uuid(BFB5EDD4-E9DA-11D1-B158-00A0C95AC277),
helpstring("Dispatch interface for IView Control"), hidden]
dispinterface_DIView
{
    properties:
    // NOTE - ClassWizard will maintain property information here.
    // Use extreme caution when editing this section.
    //{{AFX_ODL_PROP(CIViewCtrl)
    [id(1)] VARIANT GetWindowSets;
    [id(2)] Boolean NavigationFrame;
    //}}AFX_ODL_PROP
    methods:
    // NOTE - ClassWizard will maintain method information here.
    // Use extreme caution when editing this section.
    //{{AFX_ODL_METHOD(CIViewCtrl)
    [id(3)] void ShowWindow(BSTR szWindowName);
    [id(4)] void HideWindow(BSTR szWindowName);
    [id(5)] void SetApplicationDirectory(BSTR szApplicationDirectory);
    [id(6)] void CreateServerWindow( );
```

-continued

```
    [id(7)] void SetIPAddress(BSTR szIPAddress);
    [id(8)] void SetUser(BSTR szUser);
    [id(9)] void SetPassword(BSTR szPassword);
    //}}AFX_ODL_METHOD
    [id(DISPID_ABOUTBOX)] void AboutBox( );
};
```

Handler Toolkit

The IView Handler Toolkit provides an easy way for users to develop their own handlers for a specific data type. The toolkit contains an abstract class that contains the functions needed to implement a handler. That class sits above a class defining the NT service functionality. An example of a handler created using the handler toolkit is set forth below:

```
(1) class TestHandlerListener:public OutpostHandlerActionListener
{
    bool m_bDone;
    bool m_bPause;
    DWORD m_dwThreadID;
public:
    bool OnInit() {
        m_bDone    = false;
        m_bPause   = false;
        m_dwThreadID = 0;
        return true;
    }
(2) void Run(int argc,char* argv[ ]) {
        MSG msg;
        m_dwThreadID = GetCurrentThreadId( );
        while (m_bDone == false) {
            while (::PeekMessage(&msg, NULL, 0, 0, PM_REMOVE)) {
                // get next message in queue
                if (WM_QUIT == msg.message) {
                    m_bDone = TRUE;
                    Beep(400,400);
Beep(400,400);
Beep(400,400);
                    break;
                }
                ::TranslateMessage(&msg);
                ::DispatchMessage(&msg);
            }
        }
        printf("\nEnd Run threadId = %d\n," GetCurrentThreadId( ));
    }
(3) void OnStop( ) {
        m_bDone = true;
    }
(3) void OnInterrogate( ) { }
(3) void OnPause( ) {
        m_bPause = true;
    }
(3) void OnContinue( ) {
        m_bPause = false;
    }
(3) void OnShutdown( ) {
        m_bDone = true;
    }
(3) bool OnUserControl(DWORD dwOpcode) {
        return true;
    }
(4) unsigned long OnData(unsigned long uniqueSessionID,
            long lRequestSize,
            unsigned char *pRequestData,
                long *lReplySize,
            unsigned char **ppReplyData)
    {
```

-continued

```
            printf("OnData uniqueSessionID = %d\n," uniqueSessionID);
            printf("\t\tlRequestSize = %d\n," lRequestSize);
            printf("%s\n," pRequestData);
            *1ReplySize = 1RequestSize;
    *ppReplyData = (unsigned char *)
OutpostHandler::AllocateMemory(1RequestSize);
            if (*ppReplyData)
                memcpy(*ppReplyData, pRequestData, 1RequestSize);
            else
                printf("Memory Error\n");
            return 0;
        }
        (5) unsigned long OnCreateSession(unsigned long uniqueSessionID) {
            printf("OnCreateSession uniqueSessionID = %d\n,"
            uniqueSessionID);
            return 0;
        }
        (6) unsigned long OnCloseSession(unsigned long uniqueSessionID) {
            printf("OnCloseSession uniqueSessionID = %d\n,"
            uniqueSessionID);
            return 0;
        }
};
    In the handler's main method, the object is created and initialized as follows:
        (7) TestHandlerListener *pTestHandlerListener =
            new TestHandlerListener( );
        (8) OutpostHandler *pHandler = new OutpostHandler( );
        if (!pHandler->Init(argc, argv,
                pTestHandlerListener,
                handler, handler))
            printf("pHandler->Init Failed\n");
    The toolkit also allows for easy development of clients by users. Below is a class
illustrating client functionality:
class EchoListener:public IOutpostSessionListener
{
public:
    bool OKToSend;
    (9) EchoListener( ) { OKToSend = false; };
    void SessionCreated(DWORD dwSessionID) {
            cout <<"SessionCreated("<<dwSessionID<<")"<<endl;
            OKToSend = true;
        }
        (10) void SessionCreateFail(DWORD dwErrorCode) {
printf("SessionCreateFail(dwErrorCode = %ld
[0x%08x])\n," dwErrorCode, dwErrorCode);
        }
        (11) void SessionClosed(DWORD dwSessionID) {
        cout <<"SessionClosed("<<dwSessionID<<")"<<endl;
        }
        (12) void Receive(DWORD dwSessionID,
            LPVOID lpBuf,
            DWORD dwSize,
            DWORD dwRequestID,
            DWORD dwSenderID) {
            printf("Data: %.*s\n," dwSize, lpBuf);
            OKToSend = true;
        }
        (13) void SendFail(DWORD dwSessionID,
            DWORD dwReason,
            DWORD dwRequestID,
            DWORD dwSenderID) {
            printf("SendFail(RequestID:%d,SenderID:%d)\n,"
                dwRequestID, dwSenderID);
        }
        (14) void SendSucceed(DWORD dwSessionID,
            DWORD dwRequestID,
            DWORD dwSenderID) {
            printf("SendSucceed(RequestID:%d,SenderID:%d)\n,"
                dwRequestID, dwSenderID);
        }
        (15) void SessionError(DWORD dwErrorCode, char szErrorCode[128]) {
            printf("SessionError(ErrorCode = 0x%08x,
szErrorCode:%.*s)\n," dwErrorCode, 128, szErrorCode);
        }
};
    In the client, objects similar to the handler are used to open a session such as
shown below:
EchoListener    *pEchoListener = new EchoListener( );
    IOutpostSession *pSession    = new IOutpostSession( );
```

-continued

```
    bool rc = pSession->Open(outpost, handler, pEchoListener);
    if (rc == false)
    cout <<"pSession->Open Failed"<<endl;
    The loop set forth below starts the polling for data:
    for (size_t requestID=1, senderID=200; rc == true;) {
        if(pEchoListener->OKToSend == true) {
            char szWord[4096] = {0}; cout <<"Enter string:";
            if(0 == gets(szWord) || 0 == szWord[0])
                break;
pSession->Send(szWord, strlen(szWord) + 1,
requestID, senderID);
            pEchoListener->OKToSend = faise;
            requestID++, senderID++;
        }
        Sleep(500);
    }
```

Where
(1) is the abstract class needed to implement a handler;
(2) is the run method which starts the handler's thread;
(3) are six functions that correspond to the needs of a service;
(4) is a function that handles the request/reply;
(5) creates the session given a unique id passed from the client;
(6) closes the session corresponding to the id passed from the client;
(7) is the user's handler object;
(8) is the handler object provided by the toolkit;
(9) notifies the client that a session has been created;
(10) notifies the client that a session creation failed;
(11) notifies the client that a session has been closed;
(12) handles the data coming from the server;
(13) provides error information for a failed send;
(14) notifies the client that the send was successful; and
(15) provides error code information for session errors.

While a specific embodiment of this invention has been described above, those skilled in the art will readily appreciate that many modifications are possible in the specific embodiment, without materially departing from the novel teachings and advantages of this invention. Accordingly, all such modifications are intended to be included within the scope of this invention, as defined in the following claims.

Having thus described the invention, what is claimed is:

1. A method for remote control by at least one control system located on at least one first computer, said method comprising:
   a. causing the control system to gather control system information;
   b. transmitting the control system information gathered by the control system over at least one communication path to an object container on at least one second computer system; and
   c. running a software application in the object container to manipulate the transmitted control information.

2. The method for remote control as described in claim 1, further comprising:
   a. causing the at least one second computer system to gather control information;
   b. transmitting the control information gathered by the at least one second computer system over at least one communication path to an object container on the control system; and
   c. controlling the control system with the control information gathered by the at least one second computer system.

3. The method for remote control as described in claim 2, further comprising:
   a. storing the control system information gathered by the control system in a control system memory located in the first computer; and
   b. storing the control system information gathered by the at least one second computer system in the control system memory located in the first computer.

4. The method for remote control as described in claim 2, further comprising:
   a. storing the control system information gathered by the at least one second computer system in a computer system memory located in the second computer; and
   b. storing the control system information gathered by the control system in the computer system memory located in the second computer.

5. The method for remote control as described in claim 1, further comprising the at least one control system communicating with the at least one second computer system over a plurality of communication paths.

6. The method for remote control as described in claim 5, wherein the plurality of communication paths includes secure paths and non-secure paths.

7. The method for remote control as described in claim 1, wherein control system information comprises alarm data.

8. The method for remote control as described in claim 1, wherein control system information comprises runtime data, wherein incremental real time data changes are stored in a runtime data base.

9. The method for remote control as described in claim 1, wherein control system information comprises historical data.

10. A system for remote control of a local system comprising:
    a. at least one control system having memory and a CPU for sending and receiving control information and instructions at a first location;
    b. at least one first software application for manipulating the control information sent and received by the control system resident in the memory;
    c. at least one remote computer system having a CPU and memory at a second location communicating over at least one communication path with the at least one control system at the first location; and
    d. at least one desktop bound software application for manipulating the control information sent and received by the control system accessed by the remote computer system over the at least one communication path resident in the memory of the remote computer system.

11. The system for remote control as described in claim 10, wherein the communication path is selected from a communication path type, and wherein the communication path type is selected from at least one of the following:
   a. a secure communication path; and
   b. a non-secure communication path.

12. The system for remote control as described in claim 11, wherein the communication path includes at least one secure communication path which has at least one session and at least one non-secure communication path which has at least one session, wherein none of the sessions includes both a secure communication path and a non-secure communication path.

13. The system for remote control as described in claim 11, wherein the communication path includes a plurality of connections, wherein the plurality of connections are all the same communication path type, and wherein the plurality of connections are funneled through a single session.

14. The system for remote control as described in claim 10, wherein the control information comprises alarm data.

15. The system for remote control as described in claim 10, wherein the at least one communication path is operable in a single session.

16. The system for remote control as described in claim 10, wherein the at least one communication path is operable across multiple session.

17. The system for remote control as described in claim 10, wherein the control information comprises runtime data.

18. The system for remote control as described in claim 10, wherein the control information comprises historical data.

19. In a computer system having memory and a CPU for sending and receiving remote and local system information at a first location having at least one system for controlling a local system by at least one remote computer system having a CPU and memory at a second location, a computer-readable medium holding computer-executable instructions for performing a method comprising:
   a. causing the local system to gather local system information;
   b. transmitting the local system information over at least one communication path to an object container on the at least one remote computer system; and
   c. running a software application in the object container to manipulate the transmitted local system information.

20. The computer readable medium as described in claim 19, further comprising computer executable instructions for:
   a. causing the remote computer system to gather remote system information;
   b. transmitting the remote system information over at least one communication path to an object container on the control system; and
   c. controlling the local system with the remote system information.

21. The computer readable medium as described in claim 20, further comprising computer executable instructions for:
   a. storing the local system information in the computer system memory; and
   b. storing the remote system information in the computer system memory.

22. The computer readable medium as described in claim 20, further comprising computer executable instructions for:
   a. storing the local system information in the computer system memory; and
   b. storing the remote system information in the computer system memory.

23. The computer readable medium as described in claim 19, further comprising computer executable instructions for the local system communicating with the at least one remote computer system over a plurality of communication paths.

24. The computer readable medium as described in claim 23, wherein the plurality of communication paths includes secure paths and non-secure paths.

25. The computer readable medium as described in claim 19, wherein local and remote system information comprises alarm data.

26. The computer readable medium as described in claim 19, wherein local and remote system information comprises runtime data, wherein incremental real time data changes are stored in a runtime data base.

27. The computer readable medium as described in claim 19, wherein local and remote system information comprises historical data.

* * * * *